United States Patent [19]

Baird, Jr. et al.

[11] 4,440,667
[45] Apr. 3, 1984

[54] CATALYST REGENERATION IN A CATALYTIC REFORMING PROCESS

[75] Inventors: William C. Baird, Jr.; Paul E. Eberly, Jr.; George J. Balinsky, all of Baton Rouge, La.

[73] Assignee: Exxon Research and Engineering Co., Florham Park, N.J.

[21] Appl. No.: 456,512

[22] Filed: Jan. 7, 1983

Related U.S. Application Data

[63] Continuation-in-part of Ser. No. 394,669, Jul. 2, 1982, abandoned.

[51] Int. Cl.³ .............................................. B01J 23/96
[52] U.S. Cl. ...................................... 502/53; 208/138
[58] Field of Search ....................... 208/138, 139, 140; 252/411 R

[56] References Cited

U.S. PATENT DOCUMENTS

| | | | |
|---|---|---|---|
| 2,737,476 | 3/1956 | Hardy et al. | 208/140 |
| 4,213,881 | 7/1980 | Eberly, Jr. | 208/139 |
| 4,220,520 | 9/1980 | Carter et al. | 208/139 |
| 4,251,392 | 2/1981 | Mauldin et al. | 208/138 |

Primary Examiner—Delbert E. Gantz
Assistant Examiner—Anthony McFarlane
Attorney, Agent, or Firm—Llewellyn A. Proctor

[57] ABSTRACT

A catalyst regeneration process wherein a platinum-iridium catalyst promoted with one or more of copper, sulfurous acid or sulfuric acid, or selenium components, preferably a platinum-iridium-selenium catalyst, is contacted with naphtha and the naphtha reformed at fluidized bed or magnetically stabilized fluidized bed severities for a period of at least 0.25 hours or at cyclic severities for a period of at least about 60 hours, or at semi-regenerative severities for a period of at least about 600 hours, and the catalyst then regenerated by contact with hydrogen.

6 Claims, No Drawings

CATALYST REGENERATION IN A CATALYTIC REFORMING PROCESS

RELATED APPLICATIONS

This is a continuation-in-part of application Ser. No. 394,669 filed July 2, 1982 and now abandoned.

I. FIELD OF THE INVENTION

This invention relates to a process for the regeneration of metal promoted platinum-iridium catalysts, particularly the regeneration of platinum-iridium-selenium catalysts with hydrogen.

II. BACKGROUND OF THE INVENTION AND PRIOR ART

Catalytic reforming, or hydroforming, is a well established industrial process employed by the petroleum industry for improving the octane quality of naphthas or straight run gasolines. In reforming, a multi-functional catalyst is employed which contains a metal hydrogenation-dehydrogenation (hydrogen transfer) component, or components, substantially atomically dispersed upon the surface of a porous, inorganic oxide support, notably alumina. Noble metal catalysts, notably of the platinum type, are currently employed, reforming being defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst.

Platinum has been widely commercially used in recent years in the production of reforming catalysts, and platinum-on-alumina catalysts have been commercially employed in refineries for the last few decades. In the last decade, polymetallic metal catalysts have been employed to provide, at reforming conditions, improved catalyst activity, selectivity and stability. Thus, additional metallic components have been added to platinum as promotors to further improve, particularly, the activity of selectivity, or both, of the basic platinum catalyst, e.g., iridium, rhenium, selenium, tin, and the like. Platinum-iridium catalysts, for example, possess superior activity for use in reforming operations as compared with platinum catalysts. Selenium has also been added to the platinum-iridium catalyst, the catalyst containing the triumvirate of metals possessing admirably higher selectivity as contrasted with platinum catalysts, or platinum-iridium catalysts, respectively, selectivity being defined as the ability of the catalyst to produce high yields of $C_5^+$ liquid products with concurrent low production of normally gaseous hydrocarbons, i.e., methane and other gaseous hydrocarbons, and coke.

In a typical process, a series of reactors constitute the heart of the reforming unit. Each reforming reactor is generally provided with fixed beds of the catalyst which receive upflow or downflow feed, and each is provided with a preheater or interstage heater, because the reactions which take place are endothermic. A naphtha feed, with hydrogen, or recycle gas, is concurrently passed through a preheat furnace and reactor, and then in sequence through subsequent heaters and reactors of the series. The product from the last reactor is separated into a liquid fraction, i.e., a $C_5^+$ or a $C_5/430°$ F. fraction, and a vaporous effluent. The latter is a gas rich in hydrogen, which usually contains small amounts of normally gaseous hydrocarbons, from which hydrogen is separated from the $C_5^+$ liquid product and recycled to the process to minimize coke production. Hydrogen is produced in net yield.

The activity of the catalyst gradually declines due, at least in part, to the building-up of coke. Coke formation is believed to result from cracking and polymerization reactions; perhaps from the deposition of coke precursors such as anthracene, coronene, ovalene and other condensed ring aromatic molecules on the catalyst, these polymerizing to form coke. During operation, the temperature of the process is gradually raised to compensate for the activity loss caused by coke deposition. Eventually, however, economics dictates the necessity of reactivating the catalyst. Consequently, in all processes of this type the catalyst must necessarily be periodically regenerated by removal of the coke from the catalyst. Typically, in the regeneration, the coke is burned from the catalyst at controlled conditions. In a regeneration of this type, the catalyst is contacted with oxygen at flame front temperatures ranging about 800° F. to about 1050° F., this being generally followed by a secondary burn with increased oxygen concentrations as coke is depleted from the catalyst. Coke has also been removed from catalysts by contact with hydrogen at elevated temperature.

Two major types of reforming are generally commercially practiced in the multi reactor units, both of which necessitate periodic reactivation of the catalyst, the initial sequence of which requires regeneration, i.e., burning the coke from the catalyst. Reactivation of the catalyst is then completed in a sequence of steps wherein the agglomerated metal hydrogenation-dehydrogenation components are atomically redispersed. In the semi-regenerative process, a process of the first type, the entire unit is operated by gradually and progressively increasing the temperature to maintain the activity of the catalyst caused by the coke deposition, until finally the entire unit is shut down for regeneration, and reactivation of the catalyst. In the second, or cyclic type of process, the reactors are individually isolated, or in effect swung out of line by various manifolding arrangements, motor operated valving and the like. The catalyst is regenerated to remove the coke deposits, and the reactivated while the other reactors of the series remain on stream. A "swing reactor" temporarily replaces a reactor which is removed from the series for regeneration and reactivation of the catalyst, until it is put back in series.

The ability to regenerate the coked catalyst during operation, as in the operation of cyclic units, means of course, that relatively short cycle lengths are possible. Thus, in the operation of a cyclic unit the reforming operation is conducted at higher severities, i.e., lower pressures, lower hydrogen recycle rates and higher temperatures than in a semi-regenerative operation. In cyclic operations, coke deposits on the catalyst at a much higher rate and hence, typically, the catalyst of a reactor must be regenerated every 60 to 80 hours. In contrast, in the operation of a semi regenerative unit the unit usually remains on stream for several months, typically about six months, or longer. Higher $C_5^+$ liquid and hydrogen yields are obtained in cyclic operations as contrasted with semi-regenerative operations.

In fluidized bed operations, and in fluidized magnetically stabilized bed operation where the catalyst is made magnetic by the incorporation of a small amount of magnetic material and a magnetic field applied, excellect contacting is achieved between the feed and catalyst. Regeneration is accomplished by transport of the fluidized bed from the reaction zone or vessel into a regeneration zone, or vessel. If desired, the bed can be moved into the regeneration zone, or zones, by appropriate manipulation of the magnetic fields.

Platinum-iridium-selenium catalysts offer significant $C_5$ + liquid yield and activity credits relative to the best of present-day commercially used catalysts, and these catalysts offer these advantages at fluidized bed, magnetically stabilized, semi-regenerative and cyclic severities. Like other known iridium-containing catalysts, however, these catalysts are highly sensitive to iridium metal agglomeration in the presence of oxygen at high temperatures. Specially developed techniques must therefore be practiced in the regeneration of such catalysts.

III. THE INVENTION

It is, in any regard, a primary objective of the present invention to provide a novel process for the regeneration of metal promoted platinum-iridium catalysts, or platinum-iridium catalysts to which one or more additional metal components have been added.

A further objective is to provide a novel reforming process for effecting with these catalysts, at specified operating conditions, the production of high octane gasolines at superior $C_5$ + liquid yields, with high catalyst activity and activity maintenance.

These objects and others are achieved in accordance with this invention, embodying a catalyst regeneration process wherein a platinum-iridium catalyst promoted with one or more of copper, sulfurous acid or sulfuric acid, or selenium component, preferably a platinum-iridium-selenium catalyst, coked after contact with naptha at reforming conditions, is regenerated by contact with hydrogen or hydrogen containing gas thereby restoring its ability to produce high yields of high octane product.

These catalysts especially the platinum-iridium-selenium catalysts, possess a novel advantage in that high activity and yield can be obtained during its use in the reforming portion of the total operating cycle. Also, these catalysts can be readily regenerated with hydrogen, this permitting their use at severe conditions; conditions heretofore impractical in commercial practice. In a fluidized bed or magnetically stabilized fluidized bed, short reaction times on the order of 0.25 to 4.0 hours can be utilized at temperatures of 950° F. to 1000° F. and pressures of 50 to 300 psig. In this type of process, it is even practical to efficiently use feedstocks containing sulfur in considerably higher concentrations than heretofore considered practical, viz., in the order of 10 parts per million parts by weight (ppm) and greater; suitably in the order of from about 10 ppm to about 150 ppm sulfur by weight. Once deactivated, the fluidized catalyst in a preferred mode of operation is rapidly transferred to a regeneration vessel wherein the carbonaceous deposit is removed by contact with hydrogen and the catalyst recycled to the reactor.

In cyclic operations, the naphtha is reformed at cyclic severities for a period of at least about 60 hours, preferably for a period ranging from about 60 hours to about 200 hours, and more preferably from about 60 hours to about 100 hours. In semi-regenerative operations, the catalyst can be contacted with naphtha and the naphtha reformed at semi-regenerative severities for a period of at least about 600 hours, preferably for a period ranging from about 600 hours to about 4000 hours, more preferably from about 600 hours to about 1000 hours. The catalyst is then regenerated in situ or ex situ by contact with the hydrogen. Cyclic severities are defined as follows, to wit:

| Operating Variables | Preferred | More Preferred |
|---|---|---|
| Pressure, psig | 100–300 | 150–200 |
| Average Reactor Temperature °F., Equivalent Isothermal Temperature, E.I.T. | 930–1000 | 950–1000 |
| Recycle Gas Rate, SCF/B | 1000–5000 | 2000–4000 |
| Feed Rate W/W/Hr. | 1–5 | 1–3 |

Semi-regenerative severities are defined as follows, to wit:

| Operating Variables | Preferred | More Preferred |
|---|---|---|
| Pressure, psig | 100–700 | 150–400 |
| Average Reactor Temperature °F., Equivalent Isothermal Temperature, E.I.T. | 850–1000 | 870–950 |
| Recycle Gas Rate, SCF/B | 1000–10,000 | 2000–6000 |
| Feed Rate W/W/Hr. | 1–5 | 1–3 |

Fluidized bed and magnetically stabilized fluidized bed severities are essentially the same as those described as cyclic severities except that the pressure preferably ranges from about 50 to about 150 psig, more preferably from about 50 to about 100 psig. The regeneration of the catalysts with hydrogen virtually completely restores the activity, selectivity, and selectivity maintenance of the catalysts for use in fluidized bed, cyclic or semi-regenerative reforming operations to essentially that of fresh catalysts.

The hydrogen regeneration step is normally carried out at unit pressure although pressure increases during the regeneration of from about 50 to about 200 psig above operating pressure may be useful. The regeneration temperature applied to the catalyst of a reactor is equal to or normally greater than the overall Equivalent Isothermal Temperature (E.I.T.) applied to the reactor during the reforming process. Suitably the temperature ranges from about 950° F. to about 1100° F., more preferably from about 950° F. to about 1050° F. The regeneration period is a function of catalyst coke level which in turn is sensitive to feed composition and severity. Thus, the frequency and duration of the hydrogen regeneration is related to on oil activity as a function of feed endpoint, operating temperature, and hydrogen and oil partial pressures as determined by unit pressure, recycle gas purity, and recycle rate. In general, the frequency of hydrogen regeneration will be determined by the rate of deactivation and the duration of regeneration by the amount of coke needed to be removed to restore an acceptable level of activity. Suitably, the regeneration period can range from about 0.5 hour to about 48 hours, a period of from about 3 hours to about 24 hours being preferred. In general, higher regeneration temperatures permit briefer regeneration periods.

The following examples and comparative demonstrations are exemplary of the present invention.

In conducting the runs exemplified hereafter a paraffinic feedstock having the inspections given in Table I was employed.

TABLE I

| ASTM Distillation, °F. | |
|---|---|
| Initial | 173 |
| 10 | 213 |
| 20 | 224 |
| 30 | 238 |
| 40 | 250 |
| 50 | 267 |
| 60 | 283 |
| 70 | 296 |
| 80 | 313 |
| 90 | 328 |
| Final B.P. | 356 |
| Octane No., RON Clear | 35 |
| Gravity, °API | 59.3 |
| Sulfur, Wt. ppm | 0.1 |
| Analysis, Vol. Percent | |
| Paraffins | 68.1 |
| Naphthenes | 21.2 |
| Aromatics | 10.7 |

EXAMPLE 1

A catalyst consisting of 0.3% Pt-0.3% Ir-0.05% Se was tested in a fixed bed reactor under conditions simulating those envisioned for a fluidized bed or magnetically stabilized, fluidized bed. The naphtha feed had the properties listed in Table I with the exception of the sulfur content which was raised to 10 ppm by the addition of thiophene. Reaction conditions were 975° F., 100 psig, 2300 SCF/B, and 4 V/V/Hr. The nominal reaction time was 15 minutes. After the reaction cycle, the catalyst was regenerated with hydrogen at 975° F., 200 psig and 4600 SCF/B for a nominal time period of 30 minutes. Results are listed in Table II.

TABLE II 0.3% Pt-0.3% Ir-0.05% Se on $Al_2O_3$ Catalyst

GC Results

| Sample | Hours on Oil | $C_4$, Wt. % | Arom. Weight % in $C_5^+$ | RON | Catalyst Activity | $C_5^+$ LV% @ 100 RON |
|---|---|---|---|---|---|---|
| 1 | 0.75 | 7.093 | 83.44 | 104.4 | 335 | — |
| 5 | 8.53 | 5.231 | 74.89 | 101.4 | 200 | — |
| 8 (Bal. 1)[1] | 12.23 | 5.150 | 78.41 | 102.5 | 244 | 79.9 |
| 9 (Bal. 2) | 13.81 | 4.961 | 72.66 | 100.6 | 167 | 79.3 |
| 10 (Bal. 3)[2] | 15.97 | 5.244 | 77.57 | 102.3 | 235 | 80.2 |
| 11 (Bal. 4) | 19.97 | 5.374 | 72.45 | 100.7 | 168 | 79.4 |
| 12 (Bal. 5) | 22.3 | 5.335 | 78.98 | 102.7 | 256 | 80.2 |
| 13 (Bal. 6) | 23.97 | 5.585 | 71.59 | 100.5 | 162 | 78.7 |
| 14 (Bal. 7) | 25.89 | 4.864 | 78.54 | 102.6 | 247 | 80.7 |
| 15 (Bal. 8) | 27.55 | 5.815 | 72.18 | 100.5 | 164 | 79.3 |
| 16 (Bal. 9) | 29.63 | 5.393 | 78.67 | 102.6 | 251 | 80.2 |
| 17 (Bal. 10) | 31.05 | 5.312 | 73.14 | 100.9 | 176 | 79.2 |
| 19 (Bal. 12) | 34.88 | 5.483 | 72.06 | 100.4 | 161 | — |
| 22 (Bal. 15) | 40.38 | 4.929 | 77.94 | 102.5 | 245 | 79.7 |
| 23 (Bal. 16) | 42.04 | 5.770 | 70.95 | 100.1 | 150 | 78.8 |
| 27 (Bal. 19) | 47.04 | 4.581 | 84.532 | 104.0 | 340 | 78.8 |
| 29 (Bal. 21) | 48.54 | 4.002 | 80.235 | 103.0 | 283 | 80.8 |
| 30 (Bal. 22) | 49.29 | 4.052 | 79.551 | 102.9 | 264 | 80.7 |
| 31 (Bal. 23) | 50.21 | 5.140 | 81.979 | 103.8 | 303 | — |
| 32 (Bal. 24) | 50.96 | 4.467 | 81.211 | 103.2 | 288 | 80.7 |
| 33 (Bal. 25) | 51.76 | 4.169 | 79.487 | 102.8 | 262 | 80.9 |
| 34 (Bal. 26) | 52.43 | 4.602 | 81.472 | 103.3 | 302 | 80.5 |
| 37 (Bal. 29) | 54.44 | 4.767 | 74.223 | 101.1 | 180 | 78.8 |
| 38 (Bal. 30) | 55.04 | 4.606 | 83.833 | 103.7 | 327 | 79.8 |
| 41 (Bal. 33) | 56.54 | 2.587 | 80.117 | 102.9 | 265 | 82.1 |
| 45 (Bal. 37) | 58.84 | 3.968 | 79.360 | 102.8 | 257 | 81.0 |
| 46 (Bal. 38)[3] | 59.59 | 4.275 | 80.477 | 103.1 | 363 | 81.2 |
| 49 (Bal. 41) | 61.33 | 3.524 | 75.349 | 101.5 | 268 | 81.1 |
| 50 (Bal. 42) | 62.0 | 4.171 | 80.829 | 103.2 | 391 | 80.7 |

TABLE II-continued 0.3% Pt-0.3% Ir-0.05% Se on $Al_2O_3$ Catalyst

GC Results

| Sample | Hours on Oil | $C_4$, Wt. % | Arom. Weight % in $C_5^+$ | RON | Catalyst Activity | $C_5^+$ LV% @ 100 RON |
|---|---|---|---|---|---|---|
| 53 (Bal. 45) | 63.74 | 3.326 | 75.221 | 101.4 | 269 | 80.8 |

[1] Regenerated overnight before Bal. 1 (conditions 975° F., 200 psig, 4600 SCF/B).
[2] Regenerated over weekend before Bal. 3 (45 hours @ 975° F., 200 psig, 4600 SCF/B).
[3] On-oil temperature reduced to 930° F.

As seen, after 45 balance periods with 64 hours on oil, no loss in catalyst activity or yields occurred.

EXAMPLE 2

A Pt-Ir-Se catalyst (0.3 wt.% Pt; 0.3 wt.% Ir; 0.05 wt.% Se) was used to reform the paraffinic naphtha at cyclic severity for a period of 80 hours. At the conclusion of this run the catalyst was regenerated with hydrogen. The conditions and results are given in Table III.

TABLE III $H_2$ Regeneration of Pt—Ir—Se In Cyclic Reforming

On-oil Run: 905° F., 140 psig, 2200 SCF/B, 1.9 W/H/W
$H_2$ Regeneration: 1000° F., 140 psig, 48 Hr.

| Pt—Ir—Se | Mid-Cycle (50 Hours) | | 80 Hours | |
|---|---|---|---|---|
| | Fresh | Regen | Fresh | Regen |
| Relative Catalyst Activity | 130 | 120 | 100 | 98 |
| $C_5^+$ LV% @ 100 RON | 76.5 | 75.8 | 75.7 | 74.8 |
| Yields, Wt. % | | | | |
| $H_2$ | 2.2 | 1.8 | | |
| $C_1$-$C_4$ | 12.7 | 13.5 | | |
| $C_5^+$ | 85.0 | 84.6 | | |
| Aromatic Selectivity, Wt. % | | | | |
| Benzene | 5.2 | 4.5 | | |
| Toluene | 18.3 | 18.9 | | |
| $C_8$ | 30.0 | 30.0 | | |
| $C_9^+$ | 46.5 | 45.8 | | |

The mid-cycle data given in Table III (50 hr. on oil) show nearly equivalent performance for fresh and $H_2$ regenerated Pt-Ir-Se. The aromatic selectivity data illustrate that the reforming chemistry of the two catalysts was not altered by the regeneration. The 80 hr. activities and yields show that the midcycle relationships persist with additional time on oil.

EXAMPLE 3

Additional runs made with the Pt-Ir-Se catalyst show that at cyclic conditions the $H_2$ regenerated Pt-Ir-Se catalyst is superior to fresh commercially used platinum-iridium and platinum-rhenium catalysts, both reference catalysts being operated at preferred cyclic conditions. Reference is made to Table IV. While no activity credit relative to the platinum-iridium catalyst is seen, a substantial Pt-Ir-Se yield credit arises from the suppression of cracking by Se.

TABLE IV

Cyclic Reforming With Regenerated Pt—Ir—Se, Pt—Re, and Pt—Ir Catalysts

| Catalyst | Regen. Pt—Ir—Se | Fresh Pt—Re | Fresh Pt—Ir |
|---|---|---|---|
| EIT, °F. | 905 | 950 | 905 |
| Catalyst Activity | 120 | 65 | 120 |
| $C_5^+$ LV% @ 100 RON | 75.3 | 73.7 | 73.6 |

EXAMPLE 4

In another run the Pt-Ir-Se catalyst was used to reform the paraffinic naphtha at semi-regen conditions. After 600–800 hours on oil the catalyst was $H_2$ regenerated at 1000° F. for 18 hours. Table V presents illustrative data

TABLE V $H_2$ Regeneration of Pt—Ir—Se In Semi-Regen Reforming of Paraffinic Naphtha On-oil Run: 910° F., 200 psig, 5000 SCF/B, 1.4 W/H/W
$H_2$ Regeneration: 1000° F., 200 psig, 18 Hr.

| Catalyst | 750 Hr. Pre-Regen | 150 Hr. Fresh | 150 Hr. Post-Regen |
|---|---|---|---|
| Catalyst Activity | 105 | 125 | 120 |
| $C_5^+$ LV% @ 100 RON | 71.8 | 72.0 | 72.0 |
| Aromatic Selectivity, Wt. % | | | |
| Benzene | 8.6 | 9.5 | 8.2 |
| Toluene | 28.4 | 29.6 | 29.8 |
| $C_8$ | 34.0 | 34.4 | 35.0 |
| $C_9^+$ | 29.1 | 26.7 | 26.9 |

The 750 hour data show the deactivated state of the catalyst prior to regeneration. The fresh and $H_2$ regenerated catalyst are compared at 150 hours on oil relative to start-of-run and post-regeneration. The ability of $H_2$ regeneration to restore fresh activity is evident. The aromatic selectivities show the identical reforming chemistry of fresh and regenerated catalyst and the difference with the deactivated catalyst where coking has produced a shift in favor of heavy aromatics.

EXAMPLE 5

Table VI further shows the effect of three successive $H_2$ regenerations at intervals of 150 hours on Pt-Ir-Se catalyst runs at semi-regen conditions for 600 hours. While the frequency of regeneration is high, the data support directionally the feasibility for multiple $H_2$ regenerations.

TABLE VI

| Catalyst | 150 Hr. Fresh | Regen 1 | Regen 2 | Regen 3 |
|---|---|---|---|---|
| Relative Catalyst Activity | 115 | 110 | 105 | 110 |
| $C_5^+$ LV% @ 100 RON | 71.0 | 70.6 | 70.6 | 70.4 |

It is apparent that various modifications and changes can be made without departing the spirit and scope of the invention.

Having described the invention, what is claimed is:

1. In a process for regeneration of a coked platinum-iridium catalyst promoted with a selenium, component which has been contacted with naphtha and the naphtha reformed for at least about 600 hours at semi-regenerative severities, the improvement comprising
   contacting said coked catalyst with hydrogen at pressures ranging from about 100 psig to about 600 psig, at temperatures ranging from about 950° F. to about 1100° F., for a period ranging from about 0.5 hour to about 48 hours to remove coke from, and regenerate said coked catalyst.

2. The process of claim 1 wherein the operating variables which define semi-regenerative severities are as follows, to wit:
   Pressure, psig: 100–700
   Average Reactor Temperature °F., Equivalent Isothermal: 850–1000
   Temperature, E.I.T. Recycle Gas Rate, SCF/B: 1000–10,000
   Feed Rate W/W/Hr.: 1–5

3. The process of claim 1 wherein the operating variables which define semi-regenerative severities are as follows, to wit:
   Pressure, psig: 150–400
   Average Reactor Temperature °F., Equivalent Isothermal: 870–950
   Temperature, E.I.T. Recycle Gas Rate, SCF/B: 2000–6000
   Feed Rate W/W/Hr.: 1–3

4. The process of either of claims 1, or 2 wherein the catalyst is contacted with naphtha and the naphtha reformed at semi-regenerative severities for a period ranging from about 600 hours to about 4000 hours, and the coked catalyst then regenerated by contact with hydrogen.

5. The process of either of claims 1, or 2 wherein the catalyst is contacted with naphtha and the naphtha reformed at semi-regenerative severities for a period ranging from about 600 hours to about 1000 hours, and the coked catalyst then regenerated by contact with hydrogen.

6. The process of any of claims 1, 2, or 3, wherein the regeneration temperature applied to the catalyst ranges from about 950° F. to about 1050° F. for a period ranging from about 10 hours to about 24 hours.

* * * * *